Feb. 17, 1953     S. E. BLEWETT     2,628,442

TEMPERATURE INDICATOR

Original Filed Aug. 4, 1947

INVENTOR
Stephen E. Blewett

BY *Webster & Webster*
ATTORNEYS

Patented Feb. 17, 1953

2,628,442

UNITED STATES PATENT OFFICE 2,628,442

TEMPERATURE INDICATOR

Stephen E. Blewett, Altadena, Calif., assignor of one-half to Stephen N. Blewett, Stockton, Calif.

Original application August 4, 1947, Serial No. 766,062. Divided and this application September 5, 1950, Serial No. 183,250

2 Claims. (Cl. 40—70)

This application is a division of copending application, Serial No. 766,062, filed August 4, 1947, on Weather Indicator, now Patent No. 2,526,114.

This invention provides as a major object, a novel, portable or pocket device operative—upon manual adjustment or setting pursuant to a code indicia broadcast on the radio or published in a newspaper—to visually indicate a forecast of a weather condition, or an existing weather condition.

While the present device is especially designed as a weather indicator, its use is not so limited, and the device may be readily adapted to forecast or indicate other weather conditions, such as snow depth at a predetermined point, rain gauge readings at a given station, or the like.

Another important object of the present invention is to provide a weather condition indicator of the type described which comprises a novel disc and dial assembly; the front disc being ported or windowed in a manner to register with predetermined parts of one dial whereby when the latter is set with selected code indicia in register with one window another part of the dial registers thermometer-like at a point along an elongated window in the disc.

Still another object of the invention is to provide a temperature indicator which is designed for ease and economy of manufacture.

A still further object of the invention is to provide a practical and effective temperature indicator, and yet one which will be exceedingly effective for the purpose for which it is designed.

These objects are accomplished by means of such structure and relative arrangement of parts as will fully appear by a perusal of the following specification and claims.

Figure 1:
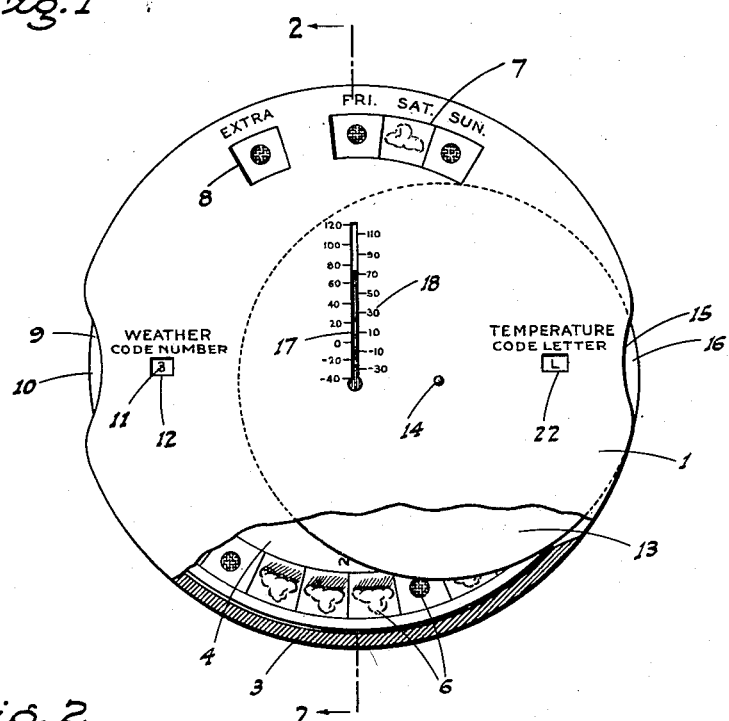
Fig. 1 is a front elevation of the device.
Figure 2:
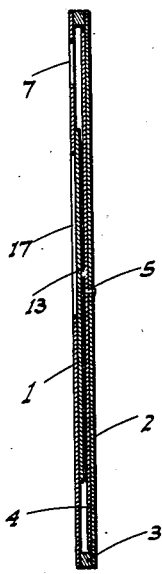
Fig. 2 is a cross section on line 2—2 of Fig. 1.
Figure 3:
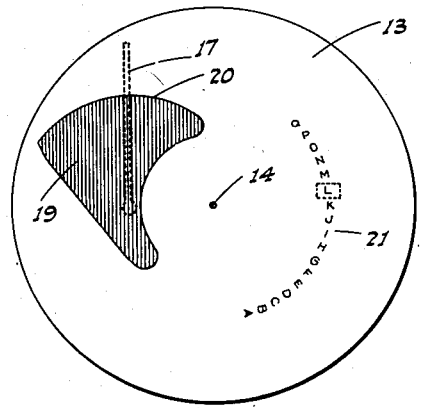
Fig. 3 is an elevation of the smaller or temperature indicating dial, detached but showing in dotted lines the relative positions of the cooperating window and slot in the front disc of the device.

Referring now more particularly to the characters of reference on the drawings, the device is readily hand-supported, or of pocket size, being circular and relatively thin, comprising a front disc 1 and a rear disc 2 connected together at the periphery by an annular spacer 3.

A relatively large dial 4 is centrally pivoted, as at 5, between the discs 1 and 2. The dial 4 carries, on its face adjacent but short of the periphery, an annular row of separate weather indicia 6 adapted to register with arcuate windows 7 and 8 in the front disc 1; the latter being cut away, as at 9, to permit of finger access to a portion 10 of the dial 4, whereby to rotate the latter to selective positions of adjustment, and in which positions of adjustment a number 11 of a concentric row thereof on the dial 4 registers through a port 12. Thus, by setting a predetermined weather code number in the port 12 corresponding to a forecast weather condition, the related weather condition as appearing in the row of weather indicia 6 will show through the windows 7 and 8.

The foregoing portion of the device is the subject of, and is claimed in, the hereinbefore identified parent application.

The invention to which the instant divisional application is directed comprises a smaller dial 13 disposed in front of the larger dial 4, and in position so that it does not obstruct either of the windows 7 or 8, or the viewing port 12. This is accomplished by pivoting the small dial 13 at an offset point, as at 14; the small dial being pivoted to the front disc 1, whereas the large dial 4 is pivoted to the rear disc 2, as previously described.

On the side of the device opposite the cutaway 9 there is another cut-away 15 through which a portion 16 of the dial 13 is accessible for finger engagement to turn said dial.

Generally centrally thereof, and extending in a radial direction, the front disc 1 is formed with a slot 17 shaped to represent—for example—a thermometer; there being gradation markings or temperature readings on the face of the front disc 1 along said slot, as at 18.

On its face the small dial 13 is provided with a colored area 19, preferably red; the effective edge 20 of the area 19 extending transversely of the direction of rotation so that upon rotation of the small dial 13 the effective edge 20 rides up or down relative to the slot 17, with a portion of said area 19 exposed through the slot 17 below such edge. This provides the visual effect of a thermometer, and by setting the small dial 13 in a given position, a corresponding temperature reading is had along the slot 17.

On the side opposite the colored area 19 the face of the small dial 13 includes an arcuate row 21 of indicia or letters concentric to the pivot 14; the front disc 1 having a viewing port 22 through which the letters of row 21 are adapted to register one at a time.

The letters of the row 21 are so disposed that each thereof corresponds to a predetermined temperature setting of the small dial 13; i. e. a predetermined temperature reading of the effective edge 20 of the red area 19 on the gradation markings or temperature readings 18.

It is proposed that in weather reports and forecasts, as broadcast or published, the existing or forecast temperature be given in one of the code letters, as in the row 21. Thus, the user need only set the small dial 13 with the code letter reading in the viewing port 22. With such setting, the effective edge 20 automatically provides the existing or forecast temperature reading through the slot 17.

Instead of reading in terms of existing or forecast temperature, the slot and dial arrangement just described can be made to read in terms of snow depth for winter sports, or in rain gauge readings or the like for general weather information.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An indicator device, for manual setting, comprising a face plate having an elongated slot therethrough, gradation marks on the front of the face plate along the slot, the face plate having a viewing port therethrough spaced from the slot, a back plate pivotaly secured to the front plate, the back plate being provided on the front thereof with a colored area having a configuration which defines an edge extending transversely of the direction of rotation and intersects the slot, whereby said edge will move along the slot in one direction or the other upon relative rotation of said plates, and a plurality of indicia in a row on the front of the back plate concentric to the axis of rotation and adapted to successively register with said port; such indicia being so disposed that when a given one thereof is in register with the port, said edge of the colored area registers with a predetermined gradation mark along the slot.

2. A device for indicating weather conditions, such device comprising a face plate provided with an elongated slot in simulation of a thermometer tube, temperature indicating gradations imprinted on the face of the plate adjacent the slot, the face plate being formed with a viewing port separate from the slot, a disc pivotally mounted on the back of the plate, the disc being provided with a colored area depicted on its face, such colored area having an edge which extends transversely of the direction of rotation of the disc and which intersects the slot with the rotation of the disc whereby such edge will visually move upwardly or downwardly along the slot with the revolution of the disc in one direction or the other, respectively, a plurality of indicia imprinted on the face of the disc concentric with the axis of the disc and arranged to be successively brought into register with the viewing port, such indicia being so disposed that when a given indicia is visible through the viewing port the said edge of the colored area will be disposed adjacent a predetermined one of said gradation marks.

STEPHEN E. BLEWETT.

REFERENCES CITED

The following references are of record in the file of this patent:

UNITED STATES PATENTS

| Number | Name | Date |
| --- | --- | --- |
| 1,438,144 | Stevenson | Dec. 5, 1922 |
| 1,813,566 | Corey | July 7, 1931 |

FOREIGN PATENTS

| Number | Country | Date |
| --- | --- | --- |
| 83,369 | Sweden | Nov. 19, 1935 |